(12) United States Patent
Lechthaler et al.

(10) Patent No.: US 11,628,716 B2
(45) Date of Patent: Apr. 18, 2023

(54) HYBRID DRIVE SYSTEM

(71) Applicant: DAIMLER AG, Stuttgart (DE)

(72) Inventors: Thomas Lechthaler, Stuttgart (DE); Jan Velthaus, Stuttgart (DE); Lukas Rube, Plüderhausen (DE); Bernhard Ziegler, Rechberghausen (DE); Bernd Koppitz, Winterbach (DE); Kai Heukelbach, Köngen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 61 days.

(21) Appl. No.: 17/437,900

(22) PCT Filed: Jan. 24, 2020

(86) PCT No.: PCT/EP2020/051724
§ 371 (c)(1),
(2) Date: Sep. 10, 2021

(87) PCT Pub. No.: WO2020/187467
PCT Pub. Date: Sep. 24, 2020

(65) Prior Publication Data
US 2022/0144070 A1 May 12, 2022

(30) Foreign Application Priority Data
Mar. 20, 2019 (DE) .................... 10 2019 001 957.1

(51) Int. Cl.
*B60K 6/387* (2007.10)
*F16D 25/0638* (2006.01)
*F16D 25/10* (2006.01)

(52) U.S. Cl.
CPC .......... *B60K 6/387* (2013.01); *F16D 25/0638* (2013.01); *F16D 25/10* (2013.01); *B60Y 2200/92* (2013.01); *F16D 2300/021* (2013.01)

(58) Field of Classification Search
CPC ................ B60K 6/387; F16D 25/0638; F16D 2021/0661; F16D 21/08; B60Y 2200/92
See application file for complete search history.

(56) References Cited

U.S. PATENT DOCUMENTS 4,947,974 A * 8/1990 Smemo ............... F16D 25/0638
192/85.28
6,929,107 B2 * 8/2005 Hegerath ............ F16D 25/0638
192/106 F (Continued)

FOREIGN PATENT DOCUMENTS

DE 112010003514 T5 10/2012
DE 102015007138 A1 1/2016

(Continued)

OTHER PUBLICATIONS

International Search Report dated Apr. 29, 2020 in related/corresponding International Application No. PCT/EP2020/051724.

(Continued)

*Primary Examiner* — Stacey A Fluhart
(74) *Attorney, Agent, or Firm* — Patent Portfolio Builders PLLC

(57) ABSTRACT

A hybrid drive system for a motor vehicle includes an input shaft, which introduces torques from an internal combustion engine into the hybrid drive system and which is mounted rotatably around an axis of rotation. An output shaft is arranged coaxially to the input shaft. The system also includes an electric machine having a stator and a rotor, and a hub non-rotatably connected to the rotor. The system further includes a wet clutch which has a first actuating piston. The hub is formed as a one-piece forged part and has a first running surface for the first actuating piston. The wet clutch is provided to non-rotatably connect the hub to the output shaft.

9 Claims, 2 Drawing Sheets

(56) References Cited

U.S. PATENT DOCUMENTS

Figure 1:
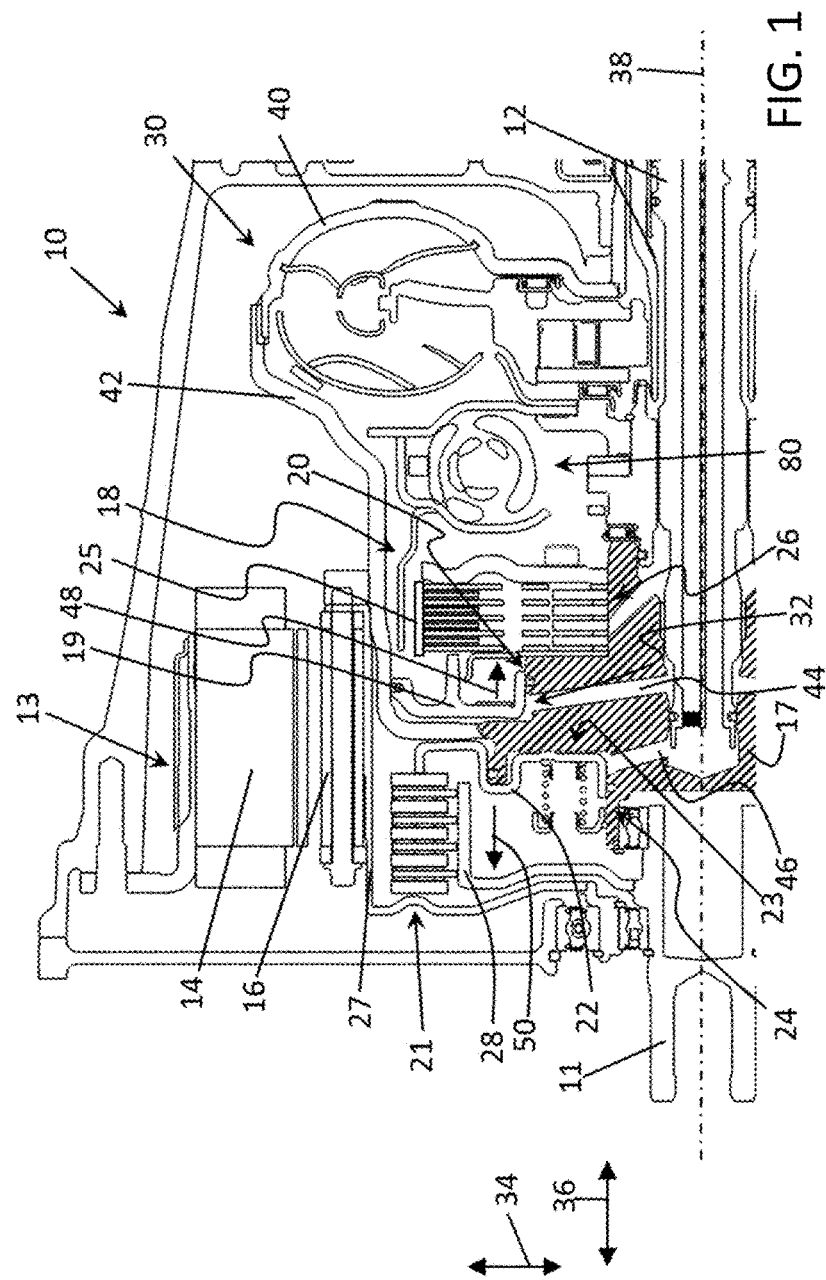

| | | | |
|---|---|---|---|
| 7,121,392 B2* | 10/2006 | Braford | F16D 25/10 |
| | | | 192/48.91 |
| 8,622,182 B2 | 1/2014 | Iwase et al. | |
| 8,652,001 B2 | 2/2014 | Iwase et al. | |
| 10,663,012 B2 | 5/2020 | Lorenz | |
| 11,035,449 B2 | 6/2021 | Velthaus et al. | |
| 2006/0144665 A1 | 7/2006 | Janson et al. | |
| 2014/0371965 A1* | 12/2014 | Ideshio | B60K 6/383 |
| | | | 701/22 |
| 2018/0238401 A1* | 8/2018 | Lorenz | F16D 21/06 |
| 2019/0190334 A1* | 6/2019 | Payne | B60K 6/387 |
| 2021/0131541 A1* | 5/2021 | Rößner | B60K 6/40 |

FOREIGN PATENT DOCUMENTS

| | | |
|---|---|---|
| DE | 102015215900 A1 | 2/2017 |
| DE | 102016014725 A1 | 6/2018 |
| DE | 102018205466 A1 | 10/2019 |
| DE | 102018205473 A1 | 10/2019 |
| JP | 2016033003 A * 3/2016 | ............ B60K 6/387 |
| WO | 2019197251 A1 | 10/2019 |

OTHER PUBLICATIONS

Office Action dated Nov. 29, 2019 in related/corresponding DE Application No. 10 2019 001 957.1.
Written Opinion dated Apr. 29, 2020 in related/corresponding International Application No. PCT/EP2020/051724.
German Patent Office Correspondance dated Feb. 6, 2023, with Opposition filed in related/corresponding DE Application No. 10 2019 001 957.1.

* cited by examiner

HYBRID DRIVE SYSTEM

BACKGROUND AND SUMMARY OF THE INVENTION

Exemplary embodiments of the invention relate to a hybrid drive system for a motor vehicle.

Such a hybrid drive system is already known from the general prior art, for example from DE 10 2015 007 138 A1.

DE 10 2016 014 725 A1 also discloses a hybrid drive system having a one-piece hub that performs a plurality of functions and can nevertheless be manufactured at low cost.

US 2006/0144665 A1 discloses a hybrid drive system in which, in addition to a wet clutch, a separating clutch is also provided, wherein an associated hub forms a running surface for an actuating piston of the separating clutch.

Exemplary embodiments of the present invention are directed to a hybrid drive system having extended functionality and yet being as compact, inexpensive, and easy to assemble as possible.

A hybrid drive system for a motor vehicle is provided, which has an input shaft provided for non-rotatably connecting the hybrid drive system to a crankshaft of an internal combustion engine. The hybrid drive system further comprises an output shaft arranged coaxially with the input shaft and adapted to be connected to a drive shaft of a transmission or, alternatively, itself forms a drive shaft of a transmission.

The hybrid drive system further has an electric machine, which has a stator and a rotor, a hub non-rotatably connected to the rotor, and a wet clutch which has a first actuating piston.

The hub is formed as a one-piece forged part, which has a first running surface for the first actuating piston.

And the wet clutch is provided to non-rotatably connect the hub to the output shaft.

It is further assumed that the hybrid drive system has a separating clutch, which in turn has a second actuating piston and an associated second actuating chamber, and which is provided to non-rotatably connect the hub to the input shaft, wherein the hub forms a second running surface for the second actuating piston.

The running surfaces for the actuating pistons are to be understood to mean, in each case, surfaces on which the actuating pistons are radially mounted and along which the actuating pistons can be axially displaced.

The terms radial and axial refer to an axis of rotation of the input shaft or an axis of rotation of the output shaft. Even when a radial direction and an axial direction are mentioned, the axis of rotation of the input shaft is referred to.

A non-rotatable connection between two rotatably mounted elements is to be understood to mean that the two elements are arranged coaxially to each other and are connected to each other in such a way that they rotate with the same angular velocity.

The actuating piston is to be understood as an intrinsically known actuating piston of a hydraulic actuating system.

An actuating chamber is to be understood to mean a chamber between the associated actuating piston and a further component, in particular the hub, wherein a hydraulic fluid can be introduced into the actuating chamber for actuating the associated clutch.

It is further assumed that the hub forms a second boundary for the second actuating chamber, wherein the second boundary has a radially inner second cylinder outer surface with respect to the axis of rotation.

According to the invention, the second boundary has a second wall arranged perpendicularly to the axis of rotation.

The invention presents a very compact hybrid drive system because the hub can be manufactured as the one-piece forged part in a first manufacturing step and can then be machined and provided with bores in a simple manner in further steps.

In a first development, the hub has a first actuating oil duct for actuating the wet clutch and a second actuating oil duct for actuating the separating clutch. The two actuating oil ducts are advantageously introduced into the hub through bores.

Furthermore, it is advantageous if the two actuating oil ducts are attached close to each other as seen in the axial direction, and the two associated actuating chambers are also arranged axially close to each other and "back to back", so to speak, such that a first actuation direction of the first actuating piston is directed opposite to a second actuation direction of the second actuating piston. Both actuation directions are thus aligned in the axial direction and oriented in opposite directions.

Advantageously, the hub forms a first seal receptacle which is provided for receiving a first seal for sealing the first actuating chamber.

Further advantageously, the hub forms a second seal receptacle and also a third seal receptacle, which are provided for receiving a second seal and a third seal for sealing the second actuating chamber.

Advantageously, the hub forms a first boundary for the first actuating chamber, wherein, with respect to the axis of rotation, the first boundary has a radially inner first cylinder outer surface and a first wall arranged perpendicularly to the axis of rotation.

Advantageously, the first wall and the second wall are arranged radially at least partially overlapping, resulting in a very compact hybrid drive system.

Advantageously, both the wet clutch and the separating clutch are designed as lamella clutches. Particularly advantageously, the separating clutch is designed as a dry lamella clutch.

Advantageously, the hub is non-rotatably connected to a second outer lamella carrier of the separating clutch and to a first inner lamella carrier of the wet clutch. Particularly advantageously, the first inner lamellae of the first inner lamella carrier of the wet clutch are screwed to the hub, wherein the hub has a threaded bore for this purpose, which is arranged in the axial direction.

Advantageously, the hub has a cooling oil duct designed to supply cooling oil to a first lamella set of the wet clutch. The first inner lamellae are part of the first lamella set.

A further development of the invention provides a bearing by means of which the hub is radially mounted relative to the output shaft, wherein the bearing is arranged between the first actuating oil duct and the cooling oil duct as viewed in the axial direction. In addition to a supporting function, the bearing also functions as a seal for sealing a cooling and lubricating oil area, to which the cooling oil duct belongs, against an actuating oil area, to which the first actuating oil duct belongs.

Further advantageous developments emerge from the drawings.

BRIEF DESCRIPTION OF THE DRAWING FIGURES

In the following, the invention is described by way of example with reference to the accompanying drawings.

Figure 2:
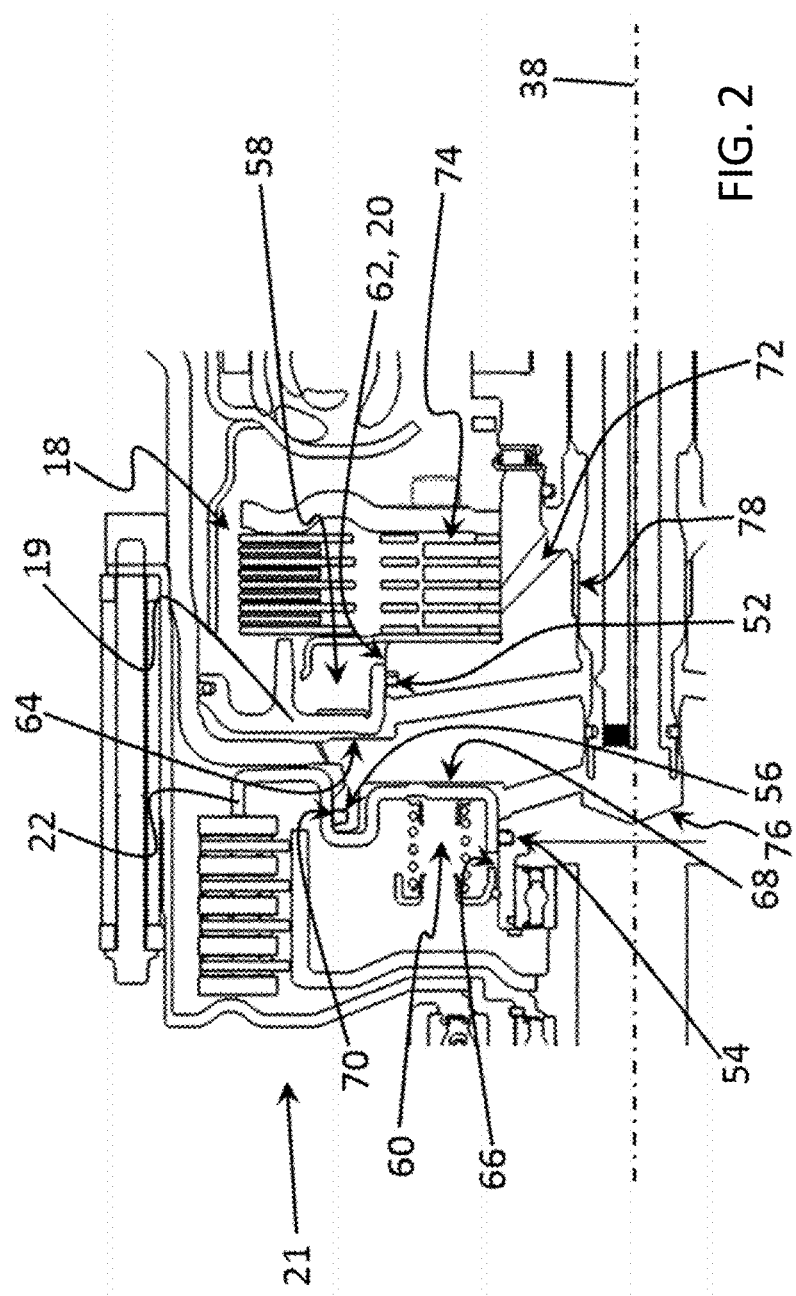

FIG. 1 shows an axial sectional view of a hybrid drive system according to the invention and FIG. 2 shows a slightly enlarged section of the axial view in FIG. 1.

DETAILED DESCRIPTION

FIG. 1 shows the hybrid drive system 10 having, as central components, an electric machine 13 which has a stator 14 and a rotor 16 non-rotatably connected to a hub 17.

FIG. 2 shows a section of FIG. 1, wherein the hub 17 is hatched in FIG. 1 and not hatched in FIG. 2.

The hybrid drive system 10 further has an input shaft 11, to which an internal combustion engine (not depicted) can advantageously be connected, and an output shaft 12, to which a downstream transmission can advantageously be connected. The input shaft 11 and the output shaft 12 are arranged coaxially to each other and are rotatably mounted around a common axis of rotation 38.

A wet clutch 18 is provided for coupling the hub 17 to the output shaft 12. The wet clutch has a first inner lamella carrier 26 non-rotatably connected to the hub 17. First inner lamellae (not specifically designated in the drawings) are non-rotatably connected to the hub 17 by means of a screw. First outer lamellae (not specifically designated in the drawing) are non-rotatably connected to the output shaft 12.

The wet clutch has a first actuating piston 19, which is axially mounted in a displaceable manner on a first running surface 20. The first running surface 20 has a substantially cylindrical shape.

The first running surface 20 is formed by the hub 17, advantageously as a cylindrical outer surface of the hub.

The hub 17 is formed as a forged part, which is manufactured in a first manufacturing step by a forging process and which can be modified in further manufacturing steps by drilling and surface treatment.

For actuating the wet clutch 18, the hub 17 has a first actuating oil duct 44. The first actuating oil duct 44 opens into a first actuating chamber 32, which is partially delimited by a first boundary 58 and to another part by the first actuating piston 19. The first boundary 58 is formed as a part of the hub 17 and has a radially inner first cylinder outer surface 62. The first cylinder outer surface 62 is arranged coaxially with respect to the axis of rotation 38. The first cylinder outer surface 62 is, at least in sections, synonymous with the first running surface 20. Furthermore, the first boundary 58 comprises a first wall 64 arranged perpendicularly to the axis of rotation 38. The first wall has the shape of an annular portion extending in a radial direction 34.

For sealing the first actuating chamber 32 against a loss of actuating oil, the hub has a first seal receptacle 52 in which a first seal is arranged. The first seal receptacle 52 is arranged in a region of the first running surface 20.

Furthermore, the first hub has a cooling oil duct 72, which opens into a region of a lamella set 74 of the wet clutch 18 and via which a cooling oil can be supplied to the lamella set 74. Both the cooling oil duct 72 and the first actuating coil duct 44 open into a bore 76 of the hub 17 in a radially inner region of the hub 17. The output shaft 12 is arranged in the bore 76, which in turn has a first actuating oil bore (not depicted in greater detail). The first actuating oil bore is connected in a known manner to the first actuating oil duct 44. A bearing 78 is arranged in the bore 76 in an axial direction 36 between a bore-side opening region of the first actuating oil duct 44 and a bore-side opening region of the cooling oil duct 72, by means of which bearing the hub 17 is radially mounted relative to the output shaft 12 and which,
together with the output shaft 12, ensures sealing of the cooling oil duct 72 relative to the first actuating oil duct 44.

The axial direction 36 is arranged parallel to the axis of rotation 38.

A first outer lamella carrier 25 of the wet clutch 18 is advantageously non-rotatably connected to the output shaft 12 via a torsional damper 80, which is arranged axially between the wet clutch 18 and the torque converter 30.

The hub 17 is non-rotatably connected to a clutch cover 42, which closes off an oil chamber around the wet clutch 18 and which in turn is non-rotatably connected to a pump wheel 40 of a torque converter 30. Torques can be transmitted from the hub 17 to the pump wheel 40 of the torque converter 30 via the clutch cover 42. In the exemplary embodiment, the wet clutch 18 is designed as a torque converter lock-up clutch.

For coupling the input shaft 11 to the hub 17, a separating clutch 21 is also provided, which has a second actuating piston 22 and an associated second actuating chamber 23. The hub thereby forms a second boundary 60 for the second actuating chamber 23, which in turn has a radially inner second cylinder outer surface 66 and a second wall 68 arranged perpendicularly to the axis of rotation. In a region of the second cylinder outer surface 66, a second seal receptacle 54 is arranged, which is formed by the hub 17 and is provided for receiving a second seal for sealing the second actuating chamber 23.

The second cylinder outer surface 66 is thereby, at least in sections, synonymous with a second running surface 24 for the second actuating piston 22.

Furthermore, the hub forms a third cylinder outer surface 70, wherein a third seal receptacle 56 is arranged in a region of the third cylinder outer surface 70, which is formed by the hub 17 and which is provided for receiving a third seal for sealing the second actuating chamber 23.

For supplying the second actuating chamber 23 with a second actuating oil, the hub 17 has a second actuating oil duct 46 which opens into the second actuating chamber 23 at its radially outer end and opens into the bore 76 of the hub 17 at its radially inner end.

The separating clutch 21 has a second outer lamella carrier 27, which is non-rotatably connected to the rotor 16, and a second inner lamella carrier 28, which is non-rotatably connected to the input shaft 11.

A first actuation direction 48 of the first actuating piston 19 and a second actuation direction 50 of the second actuating piston 22 are oriented in the axial direction 36 but opposite to each other.

Viewed in the axial direction 36, the first actuating piston 19 is arranged between the second outer lamella carrier 27 and the first outer lamella carrier 25. The second actuating piston 22 is also arranged between the second outer lamella carrier 27 and the first outer lamella carrier 25, as seen in the axial direction 36.

Advantageously, the separating clutch is designed as a dry lamella clutch. In an overall system of the hybrid drive train designed in such a way, the highly integrated hub 17 with the oil ducts in close proximity to one another, namely the first actuating oil duct 44, the second actuating oil duct 46 and the cooling oil duct 72, offers great advantages.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE NUMERAL LIST 10 hybrid drive train
11 input shaft
12 output shaft
13 electric machine
14 stator
16 rotor
17 hub
18 wet clutch
19 first actuating piston
20 first running surface
21 separating clutch
22 second actuating piston
23 second actuating chamber
24 second running surface
25 first outer lamella carrier
26 first inner lamella carrier
27 second outer lamella carrier
28 second inner lamella carrier
30 torque converter
32 first actuating chamber
34 radial direction
36 axial direction
38 axis of rotation
40 pump wheel
42 clutch cover
44 first actuating oil duct
46 second actuating oil duct
48 first actuation direction
50 second actuation direction
52 first seal receptacle
54 second seal receptacle
56 third seal receptacle
58 first boundary
60 second boundary
62 first cylinder outer surface
64 first wall
66 second cylinder outer surface
68 second wall
70 third cylinder outer surface
72 cooling oil duct
74 lamella set
76 bore
78 bearing
80 torsional damper

The invention claimed is:

1. A hybrid drive system for a motor vehicle, the hybrid drive system comprising:
an input shaft which is coupled to an internal combustion engine, which introduces torques into the hybrid drive system, and which is mounted rotatably around an axis of rotation, wherein an axial direction is arranged parallel to the axis of rotation;
an output shaft arranged coaxially to the input shaft;
an electric machine having a stator and a rotor;
a hub non-rotatably connected to the rotor;
a wet clutch having a first outer lamella carrier, a first actuating piston and an associated first actuating chamber;
a separating clutch having a second outer lamella carrier, a second actuating piston and an associated second actuating chamber,
wherein the hub is a one-piece forged part and has a first running surface for the first actuating piston,
wherein the wet clutch is configured to non-rotatably connect the hub to the output shaft,
wherein the separating clutch is configured to non-rotatably connect the hub to the input shaft, wherein the hub forms a second running surface for the second actuating piston,
wherein the hub forms a second boundary for the second actuating chamber, wherein the second boundary has a radially inner second cylinder outer surface with respect to the axis of rotation,
wherein the second boundary has a second wall arranged perpendicularly to the axis of rotation,
wherein the hub forms a first boundary for the first actuating chamber, wherein the first boundary has a radially inner first cylinder outer surface with respect to the axis of rotation and a first wall arranged perpendicular to the axis of rotation,
wherein the hub is non-rotatably connected to the second outer lamella carrier of the separating clutch and to a first inner lamella carrier of the wet clutch.

2. The hybrid drive system of claim 1, wherein the hub comprises a first actuating oil duct configured to actuate the wet clutch and a second actuating oil duct configured to actuate the separating clutch.

3. The hybrid drive system of claim 2, wherein the hub has a cooling oil duct configured to supply cooling oil to a first lamella set of the wet clutch.

4. The hybrid drive system of claim 3, further comprising:
a bearing configured to radially mount the hub relative to the output shaft, wherein the bearing is arranged between the first actuating oil duct and the cooling oil duct, as viewed in the axial direction.

5. The hybrid drive system of claim 1, wherein a first actuating device of the first actuating piston is directed opposite to a second actuating direction of the second actuating piston.

6. The hybrid drive system of claim 1, wherein, in a region of the second cylinder outer surface, the hub forms a second seal receptacle in which a second seal is arranged to seal the second actuating chamber.

7. The hybrid drive system of claim 1, wherein the hub forms a third cylindrical outer surface, and wherein the hub forms, in a region of the third cylindrical outer surface, a third seal receptacle in which a third seal is arranged to seal the second actuating chamber.

8. The hybrid drive system of claim 1, wherein, in a region of the first cylinder outer surface, the hub forms a first seal receptacle in which a first seal is arranged to seal the first actuating chamber.

9. The hybrid drive system of claim 1, wherein the first actuating piston and the second actuating piston are arranged between the second outer lamella carrier and the first outer lamella carrier, as viewed in the axial direction.

* * * * *